United States Patent [19]

Jones

[11] Patent Number: 4,844,001
[45] Date of Patent: Jul. 4, 1989

[54] REMOVABLE AND ROTATABLE COATING PAN SPRAY ARM ASSEMBLY

[75] Inventor: Jay J. Jones, Willow Grove, Pa.

[73] Assignee: McNeil Lab, Inc., Spring House, Pa.

[21] Appl. No.: 139,497

[22] Filed: Dec. 30, 1987

[51] Int. Cl.⁴ .............................................. A23G 3/26
[52] U.S. Cl. ...................................... 118/24; 118/17; 118/19
[58] Field of Search .................... 118/17, 19, 24, 302, 118/303

[56] References Cited

U.S. PATENT DOCUMENTS

| | | | |
|---|---|---|---|
| 2,336,042 | 12/1943 | Smith | 118/302 X |
| 2,677,391 | 5/1954 | Chellberg | 137/624.15 |
| 2,899,929 | 8/1959 | Monroe | 118/302 |
| 4,543,906 | 10/1985 | Glatt et al. | 118/19 X |
| 4,596,205 | 6/1986 | Dunajitschik | 118/19 X |

Primary Examiner—Shrive Beck
Assistant Examiner—Alain Bashore
Attorney, Agent, or Firm—Joseph F. Shirtz

[57] ABSTRACT

An improved coating pan apparatus and spray arm assembly are disclosed for providing facilitated maintenance and cleaning of sensitive spray nozzles. The spray arm assembly includes means for varying the spray length and spray angle from a position external to the coating drum. Additionally, this invention provides adjustment means for removing the fixture containing the spray nozzles entirely from the coating drum and laterally from the coating apparatus housing for purging.

4 Claims, 2 Drawing Sheets

REMOVABLE AND ROTATABLE COATING PAN SPRAY ARM ASSEMBLY

FIELD OF THE INVENTION

This invention relates to spray arm assemblies for coating solid medicaments, and more particularly, to improving the degree of motion of such spray arm assemblies.

BACKGROUND OF THE INVENTION

Currently available coating pans for medicament preparation include spray assemblies for applying coatings to tablets, for example, sugar coatings. See Accela-Cota ® by Driamusa, Inc., Spartanburg, South Carolina; Hi-Coaters ® by Vector/Freund; and Glatt-Coater ® by Glatt Air Techniques, Inc., Ramsey, NJ. The spray arm assemblies of these devices represent the state of the art in coating technology, however, they are not without limitations.

The Accela-Cota ® provides a spray collar which can be removed from the coating pan to facilitate cleaning and adjustments to the spray guns. The spray collar of this device appears to be hinged to the door of its housing and does not provide external adjustment means for adjusting the "spray distance", the distance between the nozzle and the pan, or the angle of the spray guns within the pan.

The Hi-Coaters ® system from Vector/Freund provides a totally enclosed coating pan assembly having an internal spray arm. The manufacturer suggests that this device can be cleaned through the access door in the front of the unit. The Hi-Coater ® system, therefore, does not provide a purge position for cleaning, and eliminating air from, spray nozzles and feeder hoses. Moreover, it does not provide external adjustment means for varying the spray distance, or spray angle.

The Glatt Coater ® incorporates a "pull-out" nozzle arm which greatly assists maintenance of the spray nozzles. However, this device also lacks means for adjusting the angle and spray distance for the nozzles. In addition, this device does not suggest a method for externally purging the feeding lines and it is expected that such a procedure would be difficult to implement.

Accordingly, a need exists for a coating pan apparatus and spray arm assembly which permits adjustments to be made to the spray distance and the angle of the spray nozzles. There is also a need for a more flexible spray arm assembly which can enable facilitated maintenance and purging.

SUMMARY OF THE INVENTION

This invention provides a coating pan apparatus suitable for coating pharmaceutical medicaments having a spray arm assembly with a plurality of degrees of motion. The spray arm assembly includes a longitudinal member slidably mounted on an exterior surface of the coating pan housing along an axis which is substantially parallel to a central axis of rotation of a cylindrical drum of the coating pan apparatus. The assembly includes an elbow portion rotatably mounted at one end of the longitudinal member and a fixture means disposed on the elbow portion for holding a spray nozzle within the cylindrical drum. The longitudinal member of the spray arm assembly is capable of sliding a sufficient distance to permit the removal of the spray nozzle from the drum for maintenance and purging.

Accordingly, a spray arm assembly is provided which permits the spray nozzles to be quickly removed from the coating pan directly. The preferred embodiment accomplishes this by placing the whole assembly on linear ball bearings to obtain linear motion. The spray arm assembly provides its operator with easy maintenance and handling. It also provides research departments with infinite adjustments to the spray distance and spray angles even during the coating process.

In the most preferred embodiments of this invention, the elbow can be equipped with adjustment means for providing linear motion so that the spray dwell time or spray length of the apparatus can be adjusted from a position external to the housing. The elbow, moreover, can be rotatable from a first position for spraying medicaments within the drum to a second position external to the drum for purging the spray nozzle, i.e. with deionized water.

It is, therefore, an object of this invention to provide an improved coating pan apparatus with greater accessibility to its spray nozzles.

It is another object of this invention to provide a spray arm assembly having greater degrees of motion.

It is still another object of this invention to provide a spray arm assembly having external controls for setting the spray distance and angle of the spray nozzles.

It is still another object of this invention to provide a spray arm assembly that can be positioned external to the coating pan drum for facilitated purging.

With these, and other objects in view which will become apparent to one skilled in the art as the description proceeds, this invention resides in the novel construction, combination, arrangement of parts and methods substantially as hereinafter described and more particularly defined by the attached claims.

BRIEF DESCRIPTION OF THE DRAWINGS

The accompanying drawings illustrate a complete embodiment of the invention according to the best mode so far devised for the practical application of the principles thereof and in which.

DETAILED DESCRIPTION OF THE INVENTION

The present ivnention presents improvements to the manufacturing of thin film coatings for solid medicaments. The film coatings are generally applied through spray nozzles which must be accurately positioned within a coating pan to provide consistent thicknesses. The spray assembly provides the connection between the spray nozzles and the coating pan. This invention improves upon currently available spray arm assemblies by allowing the spray nozzles to be quickly removed from the coating pan directly. The assembly is placed on linear ball bearings and adjustment means are provided for rotating the elbow portion of the spray arm assembly and for varying the elbow portion's length. By extending or shortening the elbow, or preferred cantilever arm, and also by changing the angular position of the arm, an infinite number of points may be obtained. These variations are important to accommodate different coating compositions, for example, sugar coatings, etc.

Figure 1:
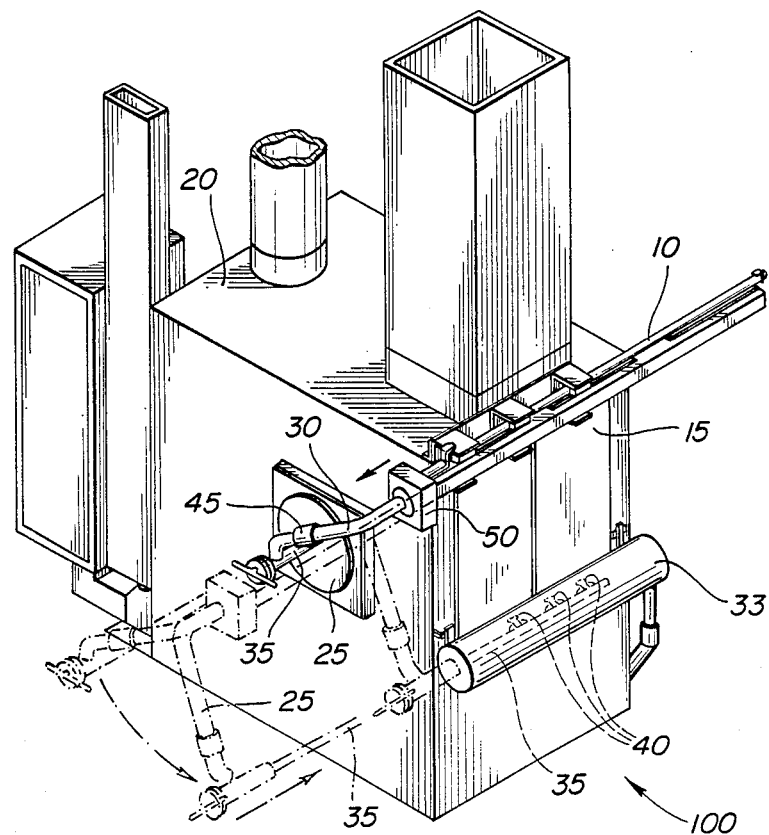
FIG. 1 is a perspective view of the coating pan apparatus of this invention, illustrating in phantom, the degrees of motion of the spray arm assembly.
Figure 2:
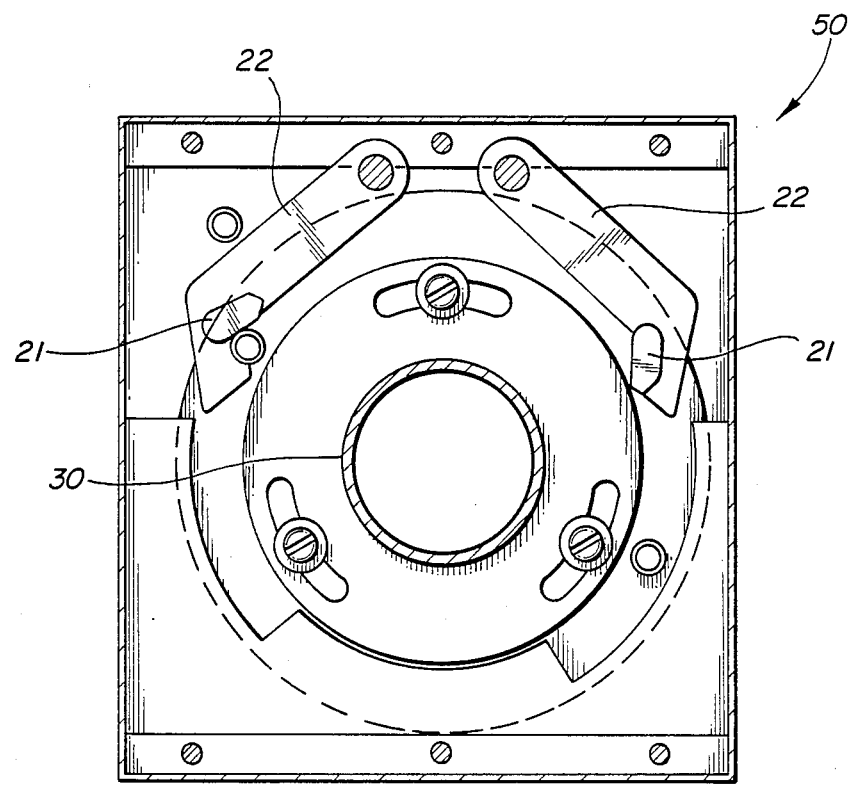
FIG. 2 is a cross-sectional view of the preferred pan and latch means for providing rotation to the elbow of the spray arm assembly.
Figure 3:
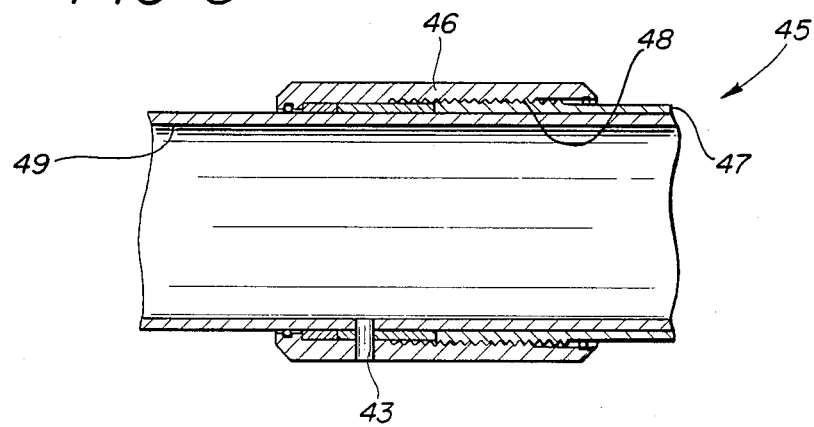
FIG. 3 is a cross-sectional view of the preferred adjustment means for providing linear motion to the elbow of the spray arm assembly.

Referring now to FIG. 1–3, a novel coating pan apparatus 100, embodying the teachings of this invention, is illustrated. The apparatus is similar to those currently available for coating pharmaceutical medicaments in that it contains a housing 20 and a generally cylindrical drum 25 disposed within the housing 20.

In an important feature of this invention, the coating pan apparatus includes a spray arm assembly mounted on an exterior surface 15 of the housing 10 along an axis which is substantially parallel to a central axis of rotation of the cylindrical drum 25. The assembly of this invention includes an elbow portion 30 rotatably mounted at one end of the longitudinal member 10. The elbow portion 30 also includes fixture means 35 disposed thereon for holding a spray nozzle within the drum 25. The longitudinal member 10 of this invention is capable of sliding a sufficient distance to permit a removal of the spray nozzle from the drum 25.

In another important aspect of this invention, described in FIG. 1, the elbow portion 30 can comprise adjustment means 45, further illustrated in FIG. 3, for providing linear motion to the elbow 30. With this feature, the spray length of the apparatus can be adjusted from a position external to the housing 20.

Preferably the apparatus of this invention includes a plurality of spray nozzles 40 located on the fixture 35. In addition, the elbow portion 30 can be rotatably mounted to the longitudinal member 10 to provide a first position for spraying medicaments within the drum 25, and to a second position external to the drum for purging the spray nozzle or nozzles 40, as depicted in FIG. 1. To facilitate this purging technique, the longitudinal member 10 of the spray arm assembly is preferably mounted to the housing 70 on linear ball bearings to obtain linear motion. This will enable the fixture means 35 to be removed from the drum 25 and placed in a suitable drainage container 33 for purging.

Referring now to FIG. 2, the novel pin and latch means 50 is depicted for providing the elbow 30 with at least two rotation positions. As the elbow 30 rotates, the pins 21 contact the latches 22 to provide a first position, preferably within the coating pan 25, and a second position preferably in the purge container 33. Although specific hardware is depicted, it is evident that those familiar with the mechanical arts can readily employ variations of this pin and latch means for effecting rotatable motion to the elbow 30.

Referring now to FIG. 3, a cross-sectional view of the adjustment means 45 is depicted. The adjustment means 35 preferably comprises threaded cylinder 46 for rotating within the preferred teeth 48 for effecting linear motion to telescopic portions of the elbow 47 and 49. Preferably, a pin 43 is disposed through the telescopic portions 49 and 47 of elbow 30 to prevent dislocation.

From the foregoing, it can be realized that this invention provides an improved coating pan and spray assembly for providing coatings to medicaments. The spray arm assembly disclosed herein provides for easier maintenance and cleaning of sensitive spray nozzles. It also can be positioned readily for purging and has adjustments for spray length and spray angle. Although various embodiments have been illustrated, this was for the purpose of describing, but not limiting the invention. Various modifications, which will become apparent to one skilled in the art, are within the scope of this invention described in the attached claims.

What is claimed is:

1. In a coating pan apparatus of the type suitable for coating pharmaceutical medicaments, said apparatus having a housing and a generally cylindrical drum disposed within said housing, the improvement comprising:

a spray arm assembly having a longitudinal member slidably mounted on an exterior surface of said housing along an axis which is substantially parallel to a central axis of rotation of said cylindrical drum, said assembly including an elbow portion rotatably mounted at one end of said longitudinal member, said elbow portion including fixture means disposed thereon for holding a spray nozzle within said drum, said longitudinal member being capable of sliding a sufficient distance to permit a removal of said spray nozzle from said drum.

2. The apparatus of claim 1 wherein said fixture comprises a plurality of spray nozzles.

3. The apparatus of claim 1 wherein said elbow portion is rotatable from a first position for spraying medicaments within said drum to a second position external to said drum for purging said spray nozzle.

4. The apparatus of claim 3 wherein said elbow portion is rotatably mounted using a pin and latch means for providing the elbow with at least two rotation positions.

* * * * *